United States Patent
Okamoto

(10) Patent No.: US 10,393,105 B2
(45) Date of Patent: Aug. 27, 2019

(54) MOTOR DRIVE DEVICE AND MOTOR DRIVE METHOD FOR VEHICLE ELECTRIC PUMP

(71) Applicant: HITACHI AUTOMOTIVE SYSTEMS, LTD., Hitachinaka-shi, Ibaraki (JP)

(72) Inventor: Naoki Okamoto, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 782 days.

(21) Appl. No.: 14/037,872

(22) Filed: Sep. 26, 2013

(65) Prior Publication Data

US 2014/0255211 A1 Sep. 11, 2014

(30) Foreign Application Priority Data

Mar. 5, 2013 (JP) .................................. 2013-042881

(51) Int. Cl.
*F04B 49/20* (2006.01)
*F04B 49/10* (2006.01)
(Continued)

(52) U.S. Cl.
CPC ............ *F04B 49/103* (2013.01); *F04B 17/03* (2013.01); *F04B 17/05* (2013.01); *F04B 49/20* (2013.01); *F16H 61/0031* (2013.01); *F16H 61/12* (2013.01); *H02P 3/025* (2013.01); *H02P 6/08* (2013.01); *B60Y 2300/18016* (2013.01); *F04B 2201/1201* (2013.01)

(58) Field of Classification Search
CPC ..................... F04B 49/103; F04B 49/20; F04B 2201/1201; F04B 17/03; F04B 35/04
See application file for complete search history.

(56) References Cited

U.S. PATENT DOCUMENTS 4,871,952 A * 10/1989 Ishizaka .................... H02P 7/29
388/829
5,931,008 A * 8/1999 Mizutani .............. B60H 1/3225
192/103 R
(Continued)

FOREIGN PATENT DOCUMENTS

JP 2001-171541 * 6/2001
JP 2001-171541 A 6/2001
(Continued)

*Primary Examiner* — Bryan M Lettman
(74) *Attorney, Agent, or Firm* — Foley & Lardner LLP

(57) ABSTRACT

A motor drive device and a motor drive method for a vehicle electric pump. The device and the method set a target value according to an instruction value of a motor control amount and control the motor of the vehicle electric pump based on the target value. When the instruction value is greater than an actual control amount, the instruction value is set to the target value. Meanwhile, when the instruction value is less than the actual control amount, the actual control amount is set to the target value when the actual control amount is less than a value less than a previous target value by a predetermined value, and the value less than previous target value by predetermined value is set to the target value of this time when the actual control amount is greater than the value less than previous target value by predetermined value.

3 Claims, 7 Drawing Sheets

(51) Int. Cl.
*F04B 17/05* (2006.01)
*F04B 17/03* (2006.01)
*H02P 6/08* (2016.01)
*H02P 3/02* (2006.01)
*F16H 61/12* (2010.01)
*F16H 61/00* (2006.01)

(56) References Cited

U.S. PATENT DOCUMENTS

| | | | |
|---|---|---|---|
| 6,188,947 B1* | 2/2001 | Zhan | B60T 8/4059 |
| | | | 303/11 |
| 6,863,502 B2* | 3/2005 | Bishop | F04B 1/0426 |
| | | | 417/280 |
| 2012/0059571 A1 | 3/2012 | Yamada et al. | |
| 2012/0313561 A1* | 12/2012 | Okamoto | H02P 7/285 |
| | | | 318/139 |

FOREIGN PATENT DOCUMENTS

| | | |
|---|---|---|
| JP | 2004-100827 A | 4/2004 |
| JP | 2012-052640 A | 3/2012 |
| WO | WO2011105468 * | 9/2011 |

* cited by examiner

FIG. 5

| | $Nin \geq Nac$ | $Nin < Nac$ | | |
|---|---|---|---|---|
| | | $Ntrold - \Delta\theta \geq Nac$ | $Ntrold - \Delta\theta < Nac$ | |
| CONDITION 1 | | | | |
| CONDITION 2 | — | | | |
| CONDITION 3 | — | — | $Nin < Ntrold - \Delta\theta$ | $Nin \geq Ntrold - \Delta\theta$ |
| TARGET VALUE TO BE SET | $= Nin$ | $= Nac$ | $= Ntrold - \Delta\theta$ | $= Nin$ |
| NUMBER IN FIG. 4 | (1) | (2) | (3) | (4) |

MOTOR DRIVE DEVICE AND MOTOR DRIVE METHOD FOR VEHICLE ELECTRIC PUMP

BACKGROUND OF THE INVENTION

1. Field of the Invention

The present invention relates to a motor drive device and a motor drive method of driving a motor for a vehicle electric pump.

2. Description of Related Art

Japanese Laid-open (Kokai) Patent Application Publication No. 2012-052640 discloses a vehicle including a mechanical oil pump, which is driven by an engine, and an electric oil pump, as oil pumps for supplying hydraulic pressure to an oil hydraulic circuit of a transmission, in which the electric oil pump is operated to supply hydraulic pressure during automatic stop of an engine.

Meanwhile, when a unit of controlling a motor of an electric pump receives an instruction value of a control amount for the motor from the outside through a communication line and controls the motor based on the received instruction value, noise may be mixed in the communication line.

When noise is mixed in a signal of the instruction value, motor may be driven by mistake, and if the motor is a synchronous motor, step-out may be caused.

As measures against such noise, delay processing for delaying change of a target value with respect to the instruction value may be performed. In this case, the raise of a fluid transfer amount and a fluid pressure may be delayed. For example, in a system configured to startup an electric oil pump associated with automatic stop of an engine, a decrease in hydraulic pressure may cause operation failure of a transmission.

SUMMARY OF THE INVENTION

An object of the present invention is thus to provide a motor drive device and a motor drive method for a vehicle electric pump, the device and the method being capable of suppressing erroneous control due to noise and also suppressing delay of the raise of a fluid transfer amount and a fluid pressure.

To achieve the object, a motor drive device for a vehicle electric pump according to an aspect of the present invention includes a response setting unit configured to set a control response with respect to an increase instruction of a control amount for a motor faster than a control response with respect to a decrease instruction of the control amount for the motor.

A motor drive method for a vehicle electric pump according to an aspect of the present invention includes the steps of: controlling the motor according to an instruction of a control amount for a motor; and setting a control response with respect to an increase instruction of the control amount for the motor faster than a control response with respect to a decrease instruction of the control amount for the motor.

Other objects and features of aspects of the present invention will be understood from the following description with reference to the accompanying drawings.

BRIEF DESCRIPTION OF THE DRAWINGS

FIG. 5 illustrates setting conditions of the target value in the control of the brushless motor of the embodiment of the present invention;

DESCRIPTION OF THE PREFERRED EMBODIMENTS

Figure 1:
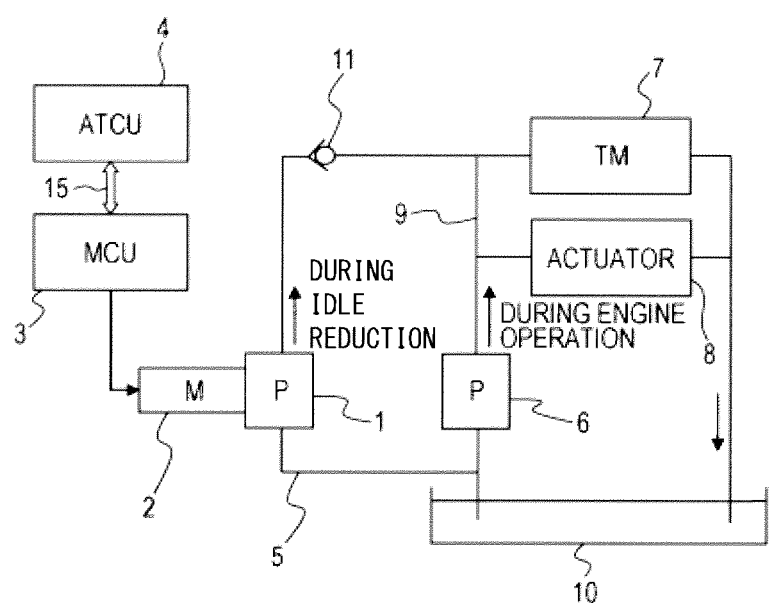
FIG. 1 is a block diagram illustrating an oil hydraulic pump system of an embodiment of the present invention.

FIG. 1 illustrates an oil hydraulic system of a vehicle oil-hydraulic automatic transmission.

The oil hydraulic system illustrated in FIG. 1 includes a mechanical oil pump 6 driven by output from an engine that is not illustrated and an electric oil pump 1, as oil pumps for supplying oil to a transmission mechanism 7 and an actuator 8.

Electric oil pump 1, which is a vehicle electric pump, is operated by an idle reduction system during automatic stop of the engine, for example, and supplies oil to transmission mechanism 7 and actuator 8 during engine stop, so as to suppress decrease of hydraulic pressure during engine stop.

Electric oil pump 1 is driven by a brushless motor 2, which is a three-phase synchronous motor.

Brushless motor 2 is controlled by a control device 3 based on an instruction signal from an automatic transmission (AT) control device 4. Control device 3 is a drive device that drives brushless motor 2 of electric oil pump 1.

Electric oil pump 1 driven by brushless motor 2 draws oil in an oil pan 10 and supplies the oil to transmission mechanism 7 and actuator 8 through an oil pipe 5.

During engine operation, mechanical oil pump 6 driven by the engine is operated. Thus, mechanical oil pump 6 supplies oil to transmission mechanism 7 and actuator 8. At this time, brushless motor 2 is in a stop state, and a check valve 11 blocks an oil flow toward electric oil pump 1.

Meanwhile, when the idle reduction system performs automatic stop of the engine, mechanical oil pump 6 stops, and then the hydraulic pressure in an oil pipe 9 decreases. Therefore, AT control device 4 transmits a motor drive instruction to control device 3 in order to suppress decrease of hydraulic pressure due to a stoppage of mechanical oil pump 6.

Control device 3 having received a motor drive instruction drives brushless motor 2 to rotate electric oil pump 1 and causes electric oil pump 1 to pump oil.

When discharge pressure of electric oil pump 1 exceeds a set pressure while discharge pressure of mechanical oil pump 6 decreases, check valve 11 is opened. Thus, oil is circulated through a path including oil pipe 5, electric oil pump 1, check valve 11, transmission mechanism 7, actuator 8 and oil pan 10.

Figure 2:
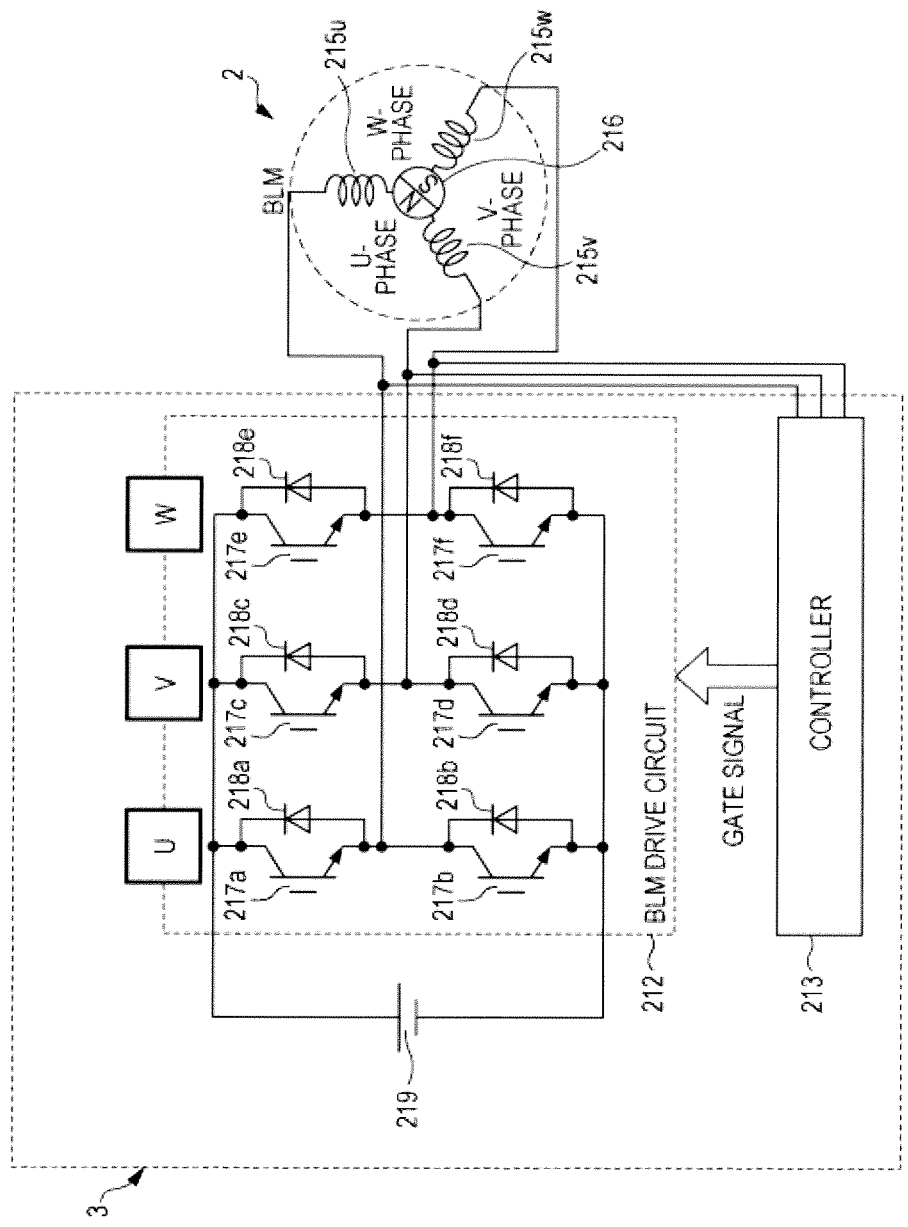
FIG. 2 is a circuit diagram illustrating a brushless motor and a control device of the embodiment of the present invention.

FIG. 2 is a circuit diagram illustrating an example of brushless motor 2 and control device 3.

Control device 3 includes a motor drive circuit 212 and a controller 213 provided with a microcomputer. The controller 213 communicates with AT control device 4.

Brushless motor 2 is a three-phase DC brushless motor. Brushless motor 2 is provided with three-phase coils 215u, 215v, 215w of U-phase, V-phase, and W-phase on a cylindrical stator, which is not illustrated, and a permanent magnet rotor 216 that is rotatable in a space formed in the center portion of the stator.

Motor drive circuit 212 includes a circuit in which switching elements 217a to 217f respectively including antiparallel diodes 218a to 218f are in three-phase bridge connection, and a power source circuit 219. Switching elements 217a to 217f can be configured by FETs.

Gate terminals of switching elements 217a to 217f are connected to controller 213, and controller 213 controls the on/off of switching elements 217a to 217f by using pulse width modulation (PWM).

AT control device 4 calculates an instruction value Nin of motor rotation speed that is a control amount for brushless motor 2, and outputs this instruction value Nin to controller 213 of control device 3.

Controller 213 calculates target rotation speed Ntr as a target value according to instruction value Nin transmitted from AT control device 4, which is an external device, through a communication line 15 and controls brushless motor 2 such that motor rotation speed Nac is closer to target rotation speed Ntr by using pulse width modulation (PWM).

An instruction value of the motor control that is output from AT control device 4 to control device 3 can be any values other than motor rotation speed including motor current and hydraulic pressure.

Calculation processing of target value Ntr based on instruction value Nin performed by controller 213 will be described here following a flow chart of FIG. 3.

Figure 3:
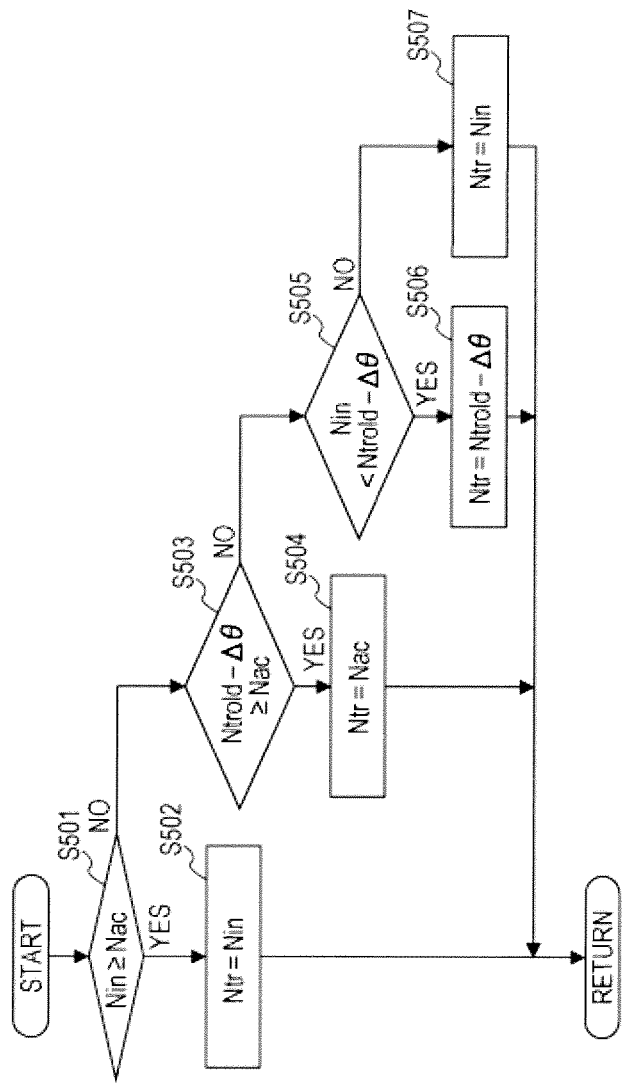
FIG. 3 is a flow chart illustrating processing of calculating a target value in control of the brushless motor of the embodiment of the present invention.

A routine illustrated in the flow chart of FIG. 3 is performed at every certain time by controller 213, that is, a microcomputer.

In step S501, controller 213 determines whether instruction value Nin is equal to or greater than actual motor rotation speed Nac, that is, whether control for increasing motor rotation speed Nac is required.

If instruction value Nin is equal to or greater than actual motor rotation speed Nac, the operation of controller 213 proceeds to step S502, to set instruction value Nin output from AT control device 4 to target rotation speed Ntr as is. With this operation, controller 213 controls brushless motor 2 so that motor rotation speed Nac increases toward instruction value Nin.

Meanwhile, if instruction value Nin is less than actual motor rotation speed Nac, and thus a control for decreasing motor rotation speed Nac is required, the operation of controller 213 proceeds to step S503.

In step S503, controller 213 determines whether a value obtained by subtracting a threshold value $\Delta\theta$ from a target value Ntrold that was set the last time this routine was executed is equal to or greater than actual motor rotation speed Nac (Ntrold$-\Delta\theta \geq$Nac).

Threshold value $\Delta\theta$ is previously adopted to be a value that does not cause step-out of brushless motor 2 even when an energization control for making brushless motor 2 to follow target value Ntr is executed as long as decrease speed of target value Ntr is equal to or less than threshold value $\Delta\theta$ for one execution cycle of this routine. As described later, threshold value $\Delta\theta$ controls decrease speed of target value Ntr.

For example, if instruction value Nin decreases to rotation speed that is less than actual motor rotation speed Nac before actual motor rotation speed Nac increases to target value Ntr, controller 213 determines in step S503 that the condition: Ntrold$-\Delta\theta \geq$Nac is satisfied.

If controller 213 determines in step S503 that the condition: Ntrold$-\Delta\theta \geq$Nac is satisfied, the operation of controller 213 proceeds to step S504, to set motor rotation speed Nac at the time to target value Ntr. With this operation, controller 213 decreases target value Ntr, the initial value of which is actual motor rotation speed Nac, toward instruction value Nin.

If controller 213 determines that the condition: Ntrold$-\Delta\theta <$Nac is satisfied in step S503, the operation of controller 213 proceeds to step S505.

In step S505, controller 213 determines whether instruction value Nin is less than a value obtained by subtracting threshold value $\Delta\theta$ from target value Ntrold that was set the last time this routine was executed, that is, whether the condition: Nin$<$Ntrold$-\Delta\theta$ is satisfied.

If target value Ntrold set the last time is greater than instruction value Nin of this time, and a difference between instruction values Nin of this time and target value Ntrold of the last time is greater than threshold value $\Delta\theta$, the operation of controller 213 proceeds to step S506, to set a value obtained by subtracting threshold value $\Delta\theta$ from target value Ntrold of the last time to target value Ntr of this time. Thus, controller 213 decreases target value Ntr toward instruction value Nin by threshold value $\Delta\theta$ in one execution cycle.

Meanwhile, If the condition: Nin$\geq$Ntrold$-\Delta\theta$ is satisfied, that is, target value Ntr obtained by decreasing target value Ntrold of the last time by threshold value $\Delta\theta$ is less than instruction value Nin, the operation of controller 213 proceeds to step S507, to set instruction value Nin of this time to target value Ntr as is.

As described above, in the calculation processing of target value Ntr by controller 213, instruction value Nin is set to target value Ntr as is if motor rotation speed is increased to follow increasing instruction value Nin while target value Ntr is set closer to instruction value Nin at a speed of threshold value $\Delta\theta$ per one execution cycle of this routine if motor rotation speed is decreased to follow decreasing instruction value Nin. That is, a control response with respect to an increase instruction of control amount for brushless motor 2 is set to be faster than a control response with respect to a decrease instruction thereof.

With this operation, a discharge hydraulic pressure and a discharged oil amount of electric oil pump 1 can be increased corresponding to increase of instruction value Nin with good response. Therefore, upon stoppage of mechanical oil pump 6 associated with automatic stop of the engine, hydraulic pressure supply from electric oil pump 1 can be raised with good response, and decrease of hydraulic pressure in transmission mechanism 7 and actuator 8 can be suppressed. Thus, operability upon engine restart to start a vehicle can be maintained.

If noise that temporarily increases instruction value Nin is imposed on instruction value signal Nin in an a communication line connecting AT control device 4 and control device 3, controller 213 increases control target value Ntr in a stepwise manner. However, when the noise disappears and instruction value Nin decreases in a stepwise manner, controller 213 sets actual motor rotation speed Nac at that time, that is, an actual control amount that starts to increase due to the influence of the noise, to target value Ntr. Therefore, even if noise that increases an instruction value is imposed on instruction value signal Nin, excessive increase of the motor rotation speed due to the noise can be suppressed to a sufficiently small level.

Meanwhile, during decrease of instruction value Nin for brushless motor 2 associated with engine restart, for example, even if noise that further decreases instruction value Nin is imposed on instruction value signal Nin, controller 213 limits decrease speed of target value Ntr to suppress rapid decrease of target value Ntr due to the influence of the noise. Thus, step-out of brushless motor 2 due to rapid decrease of target value Ntr can be suppressed.

Controller 213 can be configured in a manner such that when instruction value Nin is changed to be increased, controller 213 changes to increase target value Ntr toward instruction value Nin by a threshold value $\Delta\theta a$, which is greater than threshold value $\Delta\theta$, in one execution cycle so that a control response with respect to an increase instruction of the control amount for brushless motor 2 is faster than a control response with respect to a decrease instruction.

Figure 4:
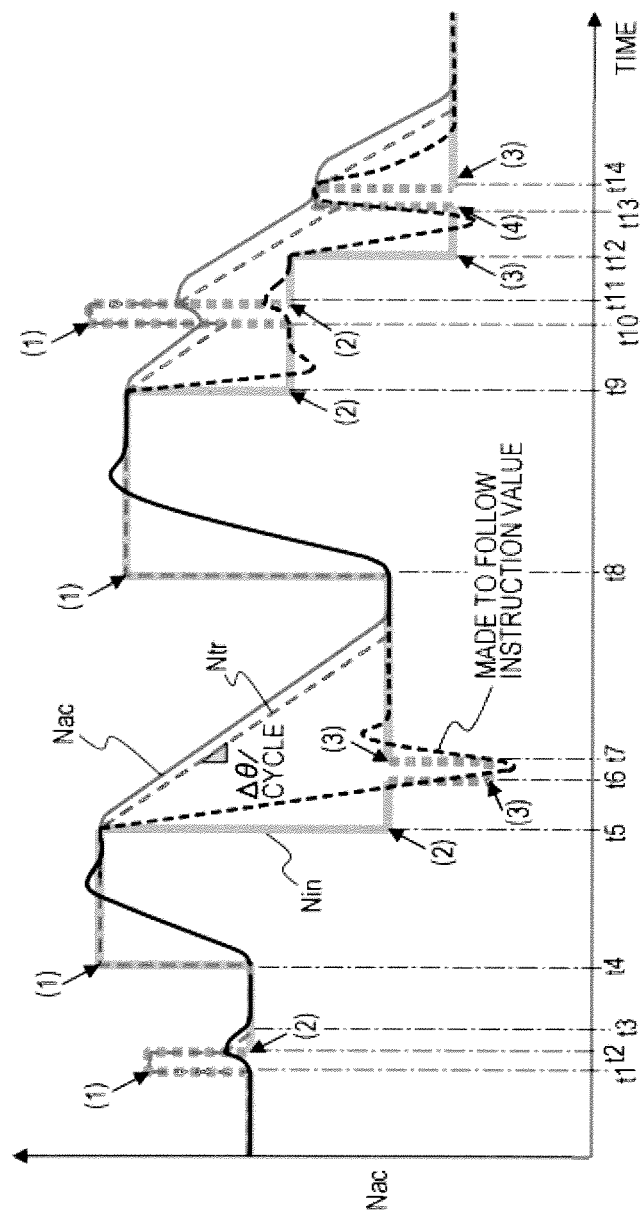
FIG. 4 is a timing diagram illustrating relationship among the target value, an instruction value, and an actual value in the control of the brushless motor of the embodiment of the present invention.

FIG. 4 is a timing diagram illustrating an example of change in target value Ntr and actual motor rotation speed Nac with respect to change in instruction value Nin input to control device 3.

FIG. 5 illustrates relationship among determination conditions provided in the flow chart of FIG. 3 and a target value. Numbers (1) to (4) indicated in FIG. 4 correspond to numbers (1) to (4) in the lowest columns in FIG. 5. For example, at timing indicated by (1) in FIG. 4, conditions indicated by (1) in FIG. 5 are satisfied.

The timing diagram of FIG. 4 is described in detail below with reference to FIG. 5.

In the timing diagram of FIG. 4, noise that increases instruction value Nin input to control device 3 in a pulse form is imposed from time t1 to time t2 when instruction value Nin output from AT control device 4 is constant.

Since the condition: Nin≥Nac is satisfied at time t1, instruction value Nin that has been increased in a stepwise manner due to the influence of the noise is set to target value Ntr as is. In addition, since the relationship: Nin≥Nac is continuously satisfied until time t2, instruction value Nin that has been increased in a stepwise manner due to the noise is set to target value Ntr as is.

At time t2, the noise disappears and instruction value Nin input to control device 3 decreases to an actual value in a stepwise manner. Then, instruction value Nin decreases across actual motor rotation speed Nac, which has started to increase to follow target value Ntr that was increased due to the influence of the noise. Thus, the condition: Nin<Nac is satisfied. At time t2, Ntrold−$\Delta\theta$≥Nac is also satisfied, and thus actual motor rotation speed Nac having started to increase is set to target value Ntr.

Right after time t2, the condition: Nin<Nac is satisfied and the condition: Ntrold−$\Delta\theta$<Nac is satisfied. Thus, target value Ntr is decreased toward actual instruction value Nin by threshold value $\Delta\theta$ in one execution cycle, and reaches actual instruction value Nin at time t3. That is, at time t3, the system is back to a state where instruction value Nin and target value Ntr are equal to each other.

Although brushless motor 2 is controlled to make actual motor rotation speed Nac closer to instruction value Nin being increased due to the influence of the noise from time t1, instruction value Nin is back to its actual value at a time when actual motor rotation speed Nac slightly increases since a noise period is short.

When instruction value Nin is back to its actual value, actual motor rotation speed Nac at that time is set to target value Ntr, and then target value Ntr is gradually decreased toward instruction value Nin. Therefore, increase of actual motor rotation speed Nac can be suppressed also after time t2. As a result, even if noise that increases instruction value Nin is imposed when instruction value Nin is constant, excessive increase of motor rotation speed can be suppressed.

In addition, when the influence of the noise is eliminated and instruction value Nin is back to its actual value, actual motor rotation speed Nac at that time is set to target value Ntr, and thus actual motor rotation speed Nac can follow instruction value Nin with excessive delay suppressed. Therefore, wrong diagnosis of failure occurrence due to delayed convergence.

Next, instruction value Nin output from AT control device 4 increases in a stepwise manner at time t4 because the idle reduction system automatic stops the engine, for example. Then the condition: Nin≥Nac is satisfied, and thus instruction value Nin is set to target value Ntr as is. When this operation requires oil supply from electric oil pump 1, electric oil pump 1 supplies a hydraulic pressure and an oil amount with good response. Thus, decrease of hydraulic pressure due to stoppage of mechanical oil pump 6 can be suppressed as small as possible.

In order to suppress decrease of hydraulic pressure associated with switching from mechanical oil pump 6 to electric oil pump 1, instruction value Nin raised at time t4 is maintained until time t5. At time t5, instruction value Nin decreases to a level required to keep hydraulic pressure.

Since instruction value Nin thus changes to decrease, the condition: Nin<Nac is satisfied. Therefore, after time t5, target value Ntr is decreased toward instruction value Nin by threshold value $\Delta\theta$ in one execution cycle. In other words, decrease speed of target value Ntr to make it closer to instruction value Nin is limited not to be equal to or less than threshold value $\Delta\theta$ in one execution cycle of this routine.

Therefore, even if noise that would decrease instruction value Nin is imposed between time t6 to time t7, rapid decrease of target value Ntr due to the influence of the noise can be suppressed. Thus, step-out of brushless motor 2 due to rapid decrease of motor rotation speed can be suppressed.

In other words, decrease speed of target value Ntr to make it closer to instruction value Nin is limited not to be equal to or less than threshold value $\Delta\theta$ in one execution cycle of this routine, so that decrease speed of the control amount for brushless motor 2 does not exceed set speed. That is, decrease speed of motor rotation speed is limited not to exceed the set speed. Thus, decrease of motor rotation speed at speed that may cause step-out can be suppressed.

At time t8, electric oil pump 1 is switched to mechanical oil pump 6 associated to engine restart. In order to suppress decrease of hydraulic pressure due to the switching, instruction value Nin increases in a stepwise manner at time t8.

Since the condition: Nin≥Nac is satisfied in this case, instruction value Nin is set to target value Ntr as is. Therefore, the control amount for brushless motor 2 can be increased with good response, and a discharge hydraulic pressure and a discharge flow rate of electric oil pump 1 can be raised with good response.

From time t9, instruction value Nin for brushless motor 2 decreases in a stepwise manner, but target value Ntr is decreased by threshold value $\Delta\theta$ in one execution cycle of this routine.

If noise that increases instruction value Nin is imposed at time t10 in the middle of gradual decrease of target value Ntr toward instruction value Nin, the condition: Nin≥Nac is satisfied. Thus, instruction value Nin that has been increased due to the influence of the noise is set to target value Ntr as is.

However, since at time t11 when the noise disappears, the condition: Nin<Nac is satisfied and the condition: Ntrold−Δθ≥Nac is satisfied, actual motor rotation speed Nac at time t11 is set to target value Ntr. Therefore, even if noise that increases instruction value Nin is imposed, control of brushless motor 2 to make rotation speed excessively high can be suppressed.

At time t12, instruction value Nin further decreases, but the processing of decreasing target value Ntr by threshold value Δθ in one execution cycle is continued.

At time t13 when instruction value Nin decreased at time t12 is kept, noise that increases instruction value Nin is imposed. At this time, if the condition: Nin<Nac is satisfied, the condition: Ntrold−Δθ<Nac is satisfied, and the condition: Nin≥Ntrold−Δθ is satisfied, instruction value Nin is set to target value Ntr.

When the noise disappears at time t14 and instruction value Nin is back to its actual value, target value Ntr is decreased toward instruction value Nin by threshold value Δθ in one execution cycle.

In processing of calculating target value illustrated in FIGS. 3 to 5, decrease speed of target value Ntr toward instruction value Nin is suppressed so that a control response with respect to an increase instruction of a motor control amount is set to be faster than a control response with respect to a decrease instruction. However, it is possible to set a control response with respect to an increase instruction of a motor control amount faster than a control response with respect to a decrease instruction by setting a delay time for change of target value Ntr associated with change in instruction value Nin longer upon a decrease instruction than that upon an increase instruction.

Figure 6:
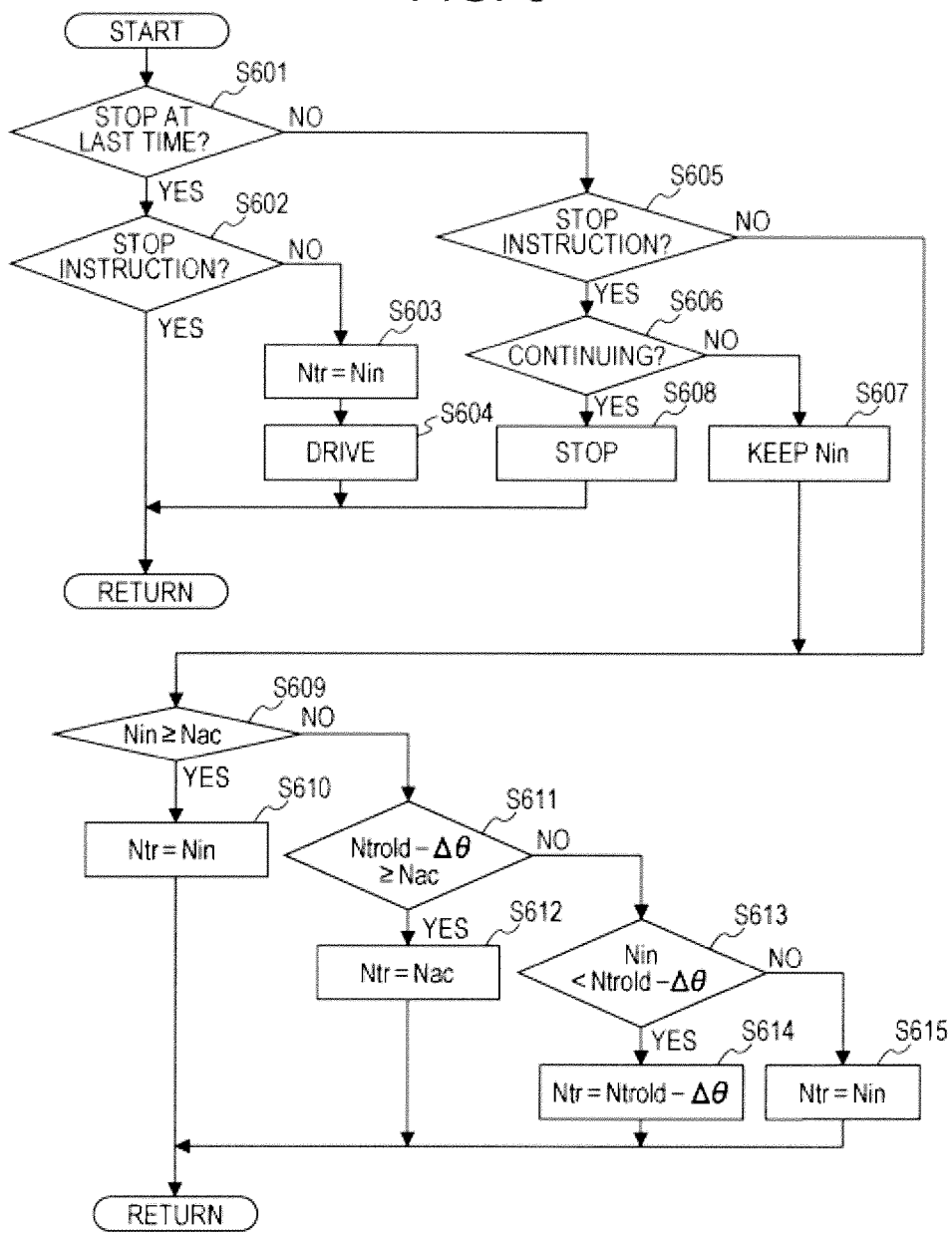
FIG. 6 is a flow chart illustrating processing of calculating the target value in control of the brushless motor of another embodiment of the present invention.

A flow chart of FIG. 6 illustrates processing of calculating target value Ntr including delay processing of change of target value Ntr with respect to change of instruction value Nin performed by controller 213.

A routine illustrated in the flow chart of FIG. 6 is executed by controller 213 at every certain time.

In step S601, controller 213 determines whether brushless motor 2 is in a stop state at the last time this routine was executed.

If brushless motor 2 is stopped at the last time, the operation of controller 213 proceeds to step S602, to determine whether instruction value Nin input this time is an instruction for driving brushless motor 2 or an instruction for keeping the stop state.

When instruction value Nin is instruction value Nin for motor rotation speed, controller 213 can determine whether the instruction is a stop instruction or a drive instruction depending on whether the instructed rotation speed is lower than a predetermined rotation speed.

If controller 213 determines in step S602 that a stop instruction for brushless motor 2 is set, the operation of controller 213 returns to step S601.

Meanwhile, if controller 213 determines in step S602 that a drive instruction for brushless motor 2 is set, the operation of controller 213 proceeds to step S603, to set instruction value Nin to target value Ntr as is. At next step S604, controller 213 starts control based on target value Ntr to startup brushless motor 2 and then the operation returns to step S601.

That is, for a startup instruction for brushless motor 2, controller 213 immediately raises target value Ntr without setting delay time in order to suppress delay of startup of brushless motor 2 with respect to startup instruction.

If controller 213 determines in step S601 that brushless motor 2 was in a drive state at the last time this routine was executed, the operation of controller 213 proceeds to step S605.

In step S605, controller 213 determines whether instruction value Nin of this time is a stop instruction or a drive instruction for brushless motor 2.

If controller 213 determines in step S605 that an instruction of this time is a drive instruction continuously from the last time, the operation of controller 213 proceeds to step S609 and following steps.

The processing starting from step S609 is the same as the processing illustrated in the flow chart of FIG. 3, and the processing similar to that performed in steps S501 to step S507 is performed in steps S609 to step S615.

Meanwhile, if controller 213 determines in step S605 that the instruction of this time is a stop instruction, the operation of controller 213 proceeds to step S606, to determine whether the stop instruction continues for a predetermined time or more. The predetermined time is previously adopted to be longer than a time for which instruction value Nin keeps the stop instruction level due to the influence of noise.

If the duration time of the stop instruction is less than the predetermined time, there is a possibility that instruction value Nin for instructing drive is changed to the stop instruction level due to the influence of noise, and thus the instruction of this time is wrongly determined to be a stop instruction.

Therefore, if controller 213 determines in step S606 that the duration time of the stop instruction is less than the predetermined time, the operation of controller 213 proceeds to step S607, to perform processing of setting instruction value Nin of the last time to instruction value Nin of this time so as to keep instruction value Nin of the last time, and then the operation proceeds to step S609 and the following steps. With this operation, it is possible to suppress stop of brushless motor 2 by mistake when noise is imposed on instruction value Nin to change it to be the stop instruction level.

Meanwhile, controller 213 determines that the stop instruction is not a wrong instruction due to the influence of noise and is actually output from AT control device 4 if the duration time of the stop instruction is equal to or greater than the predetermined time, and the operation of controller 213 proceeds to step S608.

In step S608, controller 213 stops to energize brushless motor 2 according to the stop instruction, to stop brushless motor 2, and the operation returns to step S601.

That is, when AT control device 4 outputs a stop instruction for brushless motor 2, controller 213 actually stops brushless motor 2 after the stop instruction continues for a predetermined time, and a delay time of a control response with respect to an increase instruction of a control amount for brushless motor 2 is set to be shorter than a delay time of a control response with respect to a decrease instruction.

Figure 7:
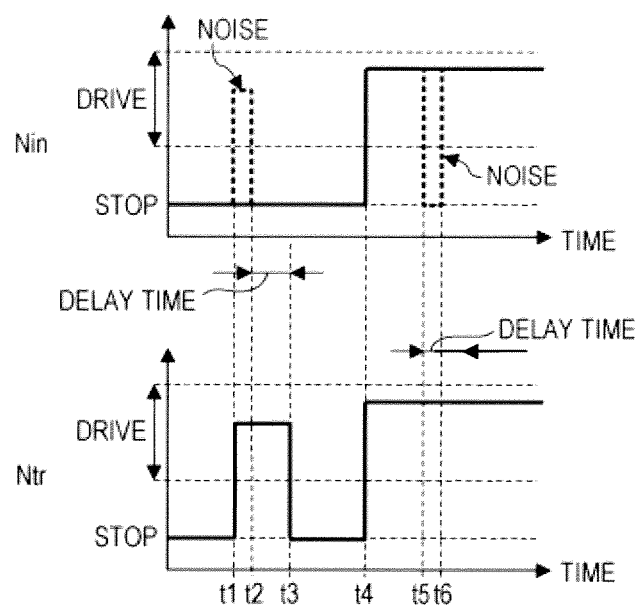
FIG. 7 is a timing diagram illustrating characteristics of stop processing for the brushless motor that has been started in control of the brushless motor of the embodiment of the present invention.

FIG. 7 is a timing diagram illustrating relationship between instruction value Nin and target value Ntr when processing from step S601 to step S608 is performed.

In FIG. 7, if noise is imposed on instruction value Nin of the stop instruction level and instruction value Nin input by controller 213 reaches a drive level at time t1 during brushless motor 2 is stopped, target value Ntr is raised from the stop level to the drive level according to instruction value Nin that is raised due to the influence of the noise. That is, for the drive instruction, brushless motor 2 is started up without delay processing.

At time t2, the noise disappears and instruction value Nin decreases to an actual stop level. However, target value Ntr is decreased to the stop level under the condition that the stop level is maintained for a predetermined time, and thus at time t2, target value Ntr is kept at a drive level of the last time or before.

Then, at time t3 in the delay time from time t2, it is determined that instruction value Nin is maintained at the stop level for the predetermined time. Thus, target value Ntr is decreased to the stop level. That is, target value Ntr is decreased to the stop level with delay of the predetermined time from decrease of instruction value Nin to the stop level.

At time t4, instruction value Nin is raised to the drive level corresponding to a normal startup request, and then target value Ntr is immediately raised to the drive level without delay processing. Thus, delay of startup of brushless motor 2 with respect to the normal startup request can be suppressed.

After brushless motor 2 is driven, at time t5, noise that decreases instruction value Nin to the stop level is imposed. However, since a delay time is set for switching to the stop level, duration time of the stop level is timed from time t5. In this case, the noise disappears at time t6 before the predetermined delay time elapses, and the duration time of the stop level does not reach the predetermined delay time, and thus, target value Ntr is kept at the drive level. Therefore, it is possible to suppress stop of brushless motor 2 by mistake due to noise.

Note that the processing from step S601 to step S608 may be performed without performing the processing of step S609 and the following steps in FIG. 6.

Threshold value $\Delta\theta$ may be a fixed value, and also may be variable depending on conditions including a control amount for brushless motor 2. For example, threshold value $\Delta\theta$ can be set greater as the motor rotation speed increases.

The contents of the present invention have been concretely described above with reference to the preferable embodiments. It should be understood, however, that a person skilled in the art can employ various modifications based on the basic technical ideas and teachings of the present invention.

For example, electric oil pump 1 is not limited to an oil pump for hydraulic pressure supply but may be any oil pump such as an oil pump for providing an oil flow rate for cooling or lubricating.

In addition, the vehicle electric pump is not limited to the electric oil pump but may be an electric water pump used to circulate cooling water of an engine in a hybrid vehicle or an electric air pump used to transfer air.

Furthermore, electric oil pump 1 may be configured to a system which is started up based on coast stop, in addition to idle reduction.

The entire contents of Japanese Patent Application No. 2013-042881, filed on Mar. 5, 2013, on which priority is claimed, are incorporated herein by reference.

While only select embodiments have been chosen to illustrate and describe the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and it is not for the purpose of limiting the invention, the invention as claimed in the appended claims and their equivalents.

What is claimed is:

1. A motor drive device, which is configured to drive a motor of a vehicle electric pump, comprising:
    a microcomputer for driving the motor of the vehicle electric pump, wherein the microcomputer is configured to:
        receive a signal providing an instruction for a motor rotation speed; and
        set a control target rotation speed for the motor to control rotation of the motor based on (a) the instructed motor speed, and (b) an actual motor rotation speed,
    wherein when the instructed motor speed is equal to or greater than the actual motor rotation speed, the microcomputer is configured to set the control target rotation speed to the instructed motor speed;
    wherein when (i) the instructed motor speed is less than the actual motor rotation speed, and (ii) the actual motor rotation speed is no more than a predetermined amount different from an immediate previous control target rotation speed, the microcomputer is configured to set the control target rotation speed to the actual motor rotation speed;
    wherein when (iii) the instructed motor speed is smaller than the actual motor rotation speed, and (iv) the actual motor rotation speed is more than the predetermined amount different from the immediate previous control target rotation speed, the microcomputer is configured to set the control target rotation speed to the immediate previous control target rotation speed minus the predetermined amount; and
    wherein the microcomputer is configured to drive the motor at the set control target rotation speed.

2. The motor drive device according to claim 1, wherein:
    when (v) the instructed motor speed is less than the actual motor rotation speed, (vi) the actual motor rotation speed is more than the predetermined amount different from the immediate previous control target rotation speed, and (vii) the immediate previous control target rotation speed minus the predetermined amount is more than the instructed motor speed, the microcomputer is configured to set the control target rotation speed to the immediate previous control target rotation speed minus the predetermined amount; and
    when (viii) the instructed motor speed is less than the actual motor rotation speed, (ix) the actual motor rotation speed is more than the predetermined amount different from the immediate previous control target rotation speed, and (x) the instructed motor speed is not less than the predetermined amount different from the immediate previous control target rotation speed, the microcomputer is configured to set the control target rotation speed to the instructed motor speed.

3. The motor drive device according to claim 1, wherein the microcomputer is configured to:
    set a first delay time before executing a stop processing when a stop instruction is issued during a drive state of the motor to be longer than a second delay time before executing a drive processing when a drive instruction is issued during a stop state of the motor.

* * * * *